Patented June 2, 1953

UNITED STATES PATENT OFFICE 2,640,858

COLD RESISTANT CELLULAR RUBBER

William U. Hohwieler, Morrisville, Pa., assignor to the United States of America as represented by the Secretary of the Army No Drawing. Application March 17, 1952, Serial No. 277,095

12 Claims. (Cl. 260—724)

The present invention relates to a cold-resistant cellular rubber composition.

More particularly, the present invention relates to a cellular, sponge-like rubber composition with low temperature qualities, such that its highly resilient properties are maintained at a temperature of −65° F., and in some cases as low as −85° F. The rubber composition may be made in numerous colors such as pure white, olive drab, black, etc., by the addition of pigments without any deleterious effect on the low temperature resilient properties of the rubber.

Periscopes, direct sighting telescopes and elbow telescopes for guns mounted on military vehicles such as tanks, motor carriages, field artillery, anti-aircraft artillery etc., are usually provided with head and eye rests in order to protect the man at the sight from excess vibrations when the vehicle and gun are being used. Previously these head and eye rests have been made by using horse hair padding covered with leather. In addition to the susceptibility of the leather to attack by fungi, the construction has proved unsatisfactory since the hair has a tendency to pack down hard and become solid, especially at low temperatures, and to absorb moisture in the pores which when it freezes causes the leather to become brittle and therefore to crack.

Head and eye rests made of sponge rubber have also been tried and found wanting since the open-pore construction of the rubber and the myriad canals and cracks interconnecting the pores make the rubber extremely absorbent with the result that decreasing temperatures and subsequent freezing of the moisture in the pores cause loss of resiliency, loss of flexibility, increase in hardness and finally brittleness.

Cellular rubber is not open to the above objections. In cellular rubber each hole or pore is surrounded by rubber. There is an absence of interconnecting channels or canals between the pores, and the entire structure presents an essentially non-porous or closed-cell condition, hence the rubber is comparatively non-absorbent, and is therefore free of internal ice formation resulting in loss of resiliency, which is characteristic of the open-celled, porous sponge rubber.

Cellular rubber has been produced experimentally by others. However, the end result has not been satisfactory since difficulty has been experienced in making the blowing agent utilized, compatible with the sulfur added for vulcanization, and still retain the necessary cell construction required for the production of effective cold-resistant cellular rubber. Additionally the prior art product has been found to be lumpy, and the cell walls have been oval and of non-uniform thickness with consequent loss in resiliency and softness.

It is therefore an object of this invention to produce a uniform, consistently soft, cellular rubber structure which is resistant to extremely cold temperature and which retains its resiliency and softness when subjected to such cold temperature.

It is also an object of this invention to disclose a composition cellular rubber structure which will stand up for a period of approximately 72 hours at 160° F., and which will also withstand, for at least 24 hours, extremely cold temperatures of −65° F. to −85° F. without objectionable loss of resiliency and softness, and without the tendency of the rubber to become tacky, crack or become brittle.

It is also a further object of this invention to produce a cellular rubber composition which is essentially non-porous and substantially non-absorbent, and therefore free of internal ice formation at low temperatures.

The following description sets forth in detail the process steps employed in the formulation of cellular rubber according to the objects before-mentioned. Eight formulations were tried, four of the formulations utilizing similar steps with substantially the same ingredients in varying proportions. The remaining four formulations were composed by mixing different proportions of four previous formulations. The end product in each case was white cellular rubber, although it is to be understood that different colors could be obtained by adding the required pigmentation at the proper time.

In the preparation of each of the formulations many of the chemicals and materials used are of a proprietary nature, and preparatory to designating the proportions of each chemical required, a list of the proprietary items by trade name and by chemical composition will be given. The list follows:

| Trade Name of Material | |
|---|---|
| R. P. A. #3 | 36.5% xylyl Mercaptan+63.5% inert Hydrocarbon. |
| Retarder W | Salicylic acid with a dispersing agent. |
| Unicel N. D. | 40% Dinitroso Pentamethylenatetramine+60% inert filler. |
| Altax | 2,2 Benzothiazyl Disulfide. |
| Tuex | Tetramethyl thiuram disulfide. |
| Rayox | Titanium dioxide. |
| Vistac #1 | Polymer of butenes, so polymerized as to produce a synthetic, heavy bodied oil-like product. |
| T. P. 90-B | Butyl Carbitol Formal, a high molecular weight polyether having the chemical formula, $C_4H_9OC_2H_4OC_2H_4OCH_2OC_2H_4OC_2H_4OC_4H_9$. |

The actual processing of the formulations is as follows. Pale Crepe is broken down and masticated by placing sheets of the material in a mill which essentially comprises two steel and cast iron cylindrical rollers, each about 16 inches in diameter and 42 inches long. The rollers rotate on parallel axes, one toward the other, with one roller rotating at a speed of 30 R. P. M. and the other at a speed of 45 R. P. M. Mastication normally takes from 30 to 35 minutes. Pale Crepe supplies the necessary rubber base and is preferred to crude rubber direct from the plantation, or smoked sheet, owing to its greater degree of uniformity.

During the breaking down process, R. P. A. #3 is added to the raw rubber in the mill. This oil-like material softens up the rubber and aids in the mastication, and facilitates the plasticizing of the crude rubber into a tacky mass preparatory to adding the other ingredients. The crude mixture is laid aside for a period of 18–24 hours and permitted to cool before the remainder of the ingredients are added. For optimum processing each batch should be in the neighborhood of 20 pounds, and the mixture should be used as promptly as possible, or at least within 3 or 4 days, to prevent spoilage due to setting of the material, since to hold it longer may destroy its ability to be "blown" into the desired cellular form.

After the mixture of rubber and R. P. A. #3 has cooled sufficiently, the other ingredients are introduced one by one with the exception of sulfur, which is not added until the mixture is thoroughly blended and mixed into the proper consistency. This blending usually takes about 30 minutes, the operator stopping the treatment when sampling indicates proper texture and freedom from lumps. Premature addition of sulfur may generate heat during the mixing operation and start the vulcanization process too soon, therefore it is expedient to add the sulfur last to obtain maximum results in the production of cellular rubber.

After the mixing and blending and the addition of sulfur, the resulting mass is placed in a mold press where heat to vulcanize and to mold the rubber is applied. Heat is applied slowly since the heating causes the blowing agent to throw off gas, and experience indicates that if gas escapes too rapidly, cellular formation is inhibited or prevented entirely.

The eight formulations are listed below. For the first four formulations the first column indicates the number of pounds of each ingredient, and the second column represents the proportion of each ingredient in terms of percentages. For convenience the trade names are used rather than the chemical identity of the various materials in each mixture.

As previously indicated the Pale Crepe supplies the required rubber base, whereas R. P. A. #3 is used to break down and soften the rubber before the other ingredients are added. Stearic acid and Vistac #1 assist in the plasticizing, additionally the stearic acid is required to insure vulcanizing action of the zinc oxide and Altax. Rayox is merely a whitening agent whereas T. P. 90–B is a low temperature plasticizer which is responsible for producing a compound which will retain its softness when subjected to temperature of from $-65°$ F. to $-85°$ F.

The Unicel N. D. and Retarder W are usually added together. Unicel N. D. is the blowing agent which inflates the cells and produces the cellular construction, however if added without the Retarder W, vulcanization may proceed at a too rapid rate. The Retarder W slows up vulcanization and permits the rubber to rise and inflate before vulcanization is effective at temperatures of from $187°$ F. to $200°$ F. Altax will not vulcanize without the presence of sulfur, whereas sulfur alone is too slow as a vulcanizer, however the combination of sulphur and Altax, as is well known, provide for rapid vulcanization. In producing cellular rubber, the step of vulcanization is very critical and therefore the proportioning of Altax and sulfur must be given special attention.

Tuex is also a vulcanizing agent, which in action is much faster than the combination of sulfur and Altax. In instances where intricate molds are required, this ingredient may be omitted, in order to allow the cells to rise better before the vulcanizing effect takes place, and at the same time give the rubber a chance to flow out into the intricate molds. Formulation No. 4 is a mixture in which Tuex has been omitted. This formulation was found to be extremely effective in molding periscope head rests, utilizing 50 pounds of steam pressure or an approximate temperature of $330°$ F. for a vulcanizing period of approximately 55 minutes.

The term cellular rubber herein is applied to mean rubber in which each cell, hole or pore presents a closed-cell condition, in contradistinction to sponge rubber presenting an open-pore condition including myriad canals and channels interconnecting the pores or holes.

Although the present invention has been described in conjunction with preferred proportions and weights of ingredients, it is to be understood that variations in proportions may be resorted to without departing from the spirit and scope of the invention, as those skilled in the art will readily understand. Such variations are considered to be within the purview and scope of the invention and the appended claims.

| Formulation | 1 | | 2 | | 3 | | 4 | |
|---|---|---|---|---|---|---|---|---|
| | Wt., Lbs. | Percent | Wt., Lbs. | Percent | Wt., Lbs. | Percent | Wt., Lbs. | Percent |
| Pale Crepe | 20.00 | 57.85 | 20.00 | 56.68 | 10.00 | 55.17 | 20.00 | 55.08 |
| R. P. A. #3 | .06 | 0.17 | .06 | 0.17 | .03 | 0.17 | .06 | 0.17 |
| Sulphur | .45 | 1.30 | .45 | 1.27 | .225 | 1.24 | .45 | 1.24 |
| Stearic Acid | .20 | 0.58 | .20 | 0.57 | .30 | 1.66 | .60 | 1.65 |
| Zinc Oxide | .60 | 1.74 | .60 | 1.71 | .50 | 2.76 | 1.00 | 2.75 |
| Retarder W | .20 | 0.58 | .20 | 0.57 | .20 | 1.10 | .40 | 1.10 |
| Unicel N. D. | 1.02 | 2.96 | 1.70 | 4.83 | .85 | 4.70 | 1.70 | 4.68 |
| Altax | .02 | 0.06 | .02 | 0.06 | .01 | 0.06 | .10 | 0.28 |
| Tuex | .02 | 0.06 | .02 | 0.06 | .01 | 0.06 | | |
| Rayox | 4.00 | 11.57 | 4.00 | 11.36 | 2.00 | 11.02 | 4.00 | 11.02 |
| Vistac #1 | 2.00 | 5.78 | 2.00 | 5.68 | 1.00 | 5.51 | 2.00 | 5.51 |
| TP 90–B | 6.00 | 17.35 | 6.00 | 17.04 | 3.00 | 16.55 | 6.00 | 16.52 |
| Total | 34.57 | 100.00 | 35.25 | 100.00 | 18.125 | 100.00 | 36.31 | 100.00 |

Formulation 5: 1 part No. 2 to 4 parts No. 3.
Formulation 6: 4 parts No. 2 to 3 parts No. 3.
Formulation 7: Small but effective amount of stearic acid not exceeding 1 pound to each 77 pounds of No. 2.
Formulation 8: Small but effective amount not exceeding 1 pound of Retarder W to each 175 pounds of No. 3.

I claim:

1. A cold resistant cellular rubber product of a composition containing 55 to 58% of Pale Crepe, up to 0.2% of a mixture of xylyl mercaptan with inert hydrocarbon; 1.2% to 1.3% sulfur; 0.50% to 1.70% stearic acid, 1.70% to 2.80% zinc oxide; 0.50% to 1.10% salicylic acid with a dispersing agent; 2.90% to 4.90% dinitroso pentamethylenetetramine with an inert filler; up to 0.3% 2,2 benzothiazyl disulfide, up to 0.1% tetramethyl thiuram disulfide, 11.0% to 12% titanium dioxide, 5.0% to 6.0% of a polymer of butenes so polymerized as to produce a synthetic, heavy-bodied oil-like product, and 16.0% to 18.0% of a high molecular weight polyether having the chemical formula $C_4H_9OC_2H_4OC_2H_4OCH_2OC_2H_4OC_2H_4OC_4H_9$ 2. The composition in claim 1 wherein said mixture of xylyl mercaptan with inert hydrocarbon contains 36.5% and 63.5% of each material respectively, and wherein dinitroso pentamethylenetetramine with inert filler consists of 40% of the former and 60% of the latter.

3. A cold resistant cellular rubber product of a composition containing 57.85% Pale Crepe; 0.17% of a mixture of xylyl mercaptan with inert hydrocarbon; 1.3 sulfur; 0.58% stearic acid; 1.74% zinc oxide; 0.58% salicylic acid with dispersing agent; 2.96% dinitroso pentamethylenetetramine with an inert filler; 0.06% 2,2 benzothiazyl disulfide; 0.06% tetramethyl thiuram disulfide; 11.57% titanium dioxide, 5.78% of a polymer of butenes so polymerized as to produce a synthetic, heavy bodied, oil-like product, and 17.35% of a high molecular weight polyether having the chemical formula $C_4H_9OC_2H_4OC_2H_4OCH_2OC_2H_4OC_2H_4OC_4H_9$ 4. The composition of claim 3 wherein said mixture of xylyl mercaptan with inert hydrocarbon contains 36.5% and 63.5% of each material respectively, and wherein dinitroso pentamethylenetetramine with inert filler consists of 40% of the former and 60% of the latter.

5. A cold resistant cellular rubber product of a composition containing 56.68% Pale Crepe; 0.17% of a mixture of xylyl mercaptan with inert hydrocarbon; 1.27% sulfur; 0.57% stearic acid, 1.71% zinc oxide; 0.57% salicylic acid with a dispersing agent; 4.83% dinitroso pentamethylenetetramine with an inert filler, 0.06% 2,2 benzothiazyl disulfide; 0.06% tetramethyl thiuram disulfide; 11.36% titanium dioxide; 5.68% of a polymer of butenes so polymerized as to produce a synthetic, heavy bodied oil-like product, and 17.04% of a high molecular weight polyether having the chemical formula $C_4H_9OC_2H_4OC_2H_4OCH_2OC_2H_4OC_2H_4OC_4H_9$ 6. The composition of claim 5 wherein said mixture of xylyl mercaptan with inert hydrocarbon contains 36.5% and 63.5% of each material respectively, and wherein dinitroso pentamethylenetetramine with inert filler consists of 40% of the former and 60% of the latter.

7. A cold resistant cellular rubber product of a composition containing 55.17% Pale Crepe; 0.17% of a mixture of xylyl mercaptan with inert hydrocarbon; 1.24% sulfur; 1.66% stearic acid; 2.76% zinc oxide; 1.10% salicylic acid with a dispersing agent; 4.70% dinitroso pentamethylenetetramine with an inert filler; 0.06% 2,2 benzothiazyl disulfide; 0.06% tetramethyl thiuram disulfide, 11.02% titanium dioxide, 5.51% of a polymer of butenes so polymerized as to produce a synthetic, heavy bodied oil-like product, and 16.55% of a high molecular weight polyether having the chemical formula $C_4H_9OC_2H_4OC_2H_4OCH_2OC_2H_4OC_2H_4OC_4H_9$ 8. The composition in claim 7 wherein said mixture of xylyl mercaptan with inert hydrocarbon contains 36.5% and 63.5% of each material respectively, and wherein dinitroso pentamethylenetetramine with inert filler consists of 40% of the former and 60% of the latter.

9. A cold cellular resistant rubber product of a composition comprising 55.08% Pale Crepe; 0.17% of a mixture of xylyl mercaptan with inert hydrocarbon, 1.24% sulfur; 1.65% stearic acid; 2.75% zinc oxide; 1.10% salicylic acid with dispersing agent, 4.68% dinitroso pentamethylenetetramine with an inert filler; 0.28% 2,2 benzothiazyl disulfide; 11.02% titanium dioxide, 5.51% of a polymer of butenes so polymerized as to produce a synthetic heavy-bodied oil-like product; and 16.52% of a high molecular weight polyether having the chemical formula $C_4H_9OC_2H_4OC_2H_4OCH_2OC_2H_4OC_2H_4OC_4H_9$ 10. The composition in claim 9 wherein said mixture of xylyl mercaptan with inert hydrocarbon contains 36.5% and 63.5% of each material respectively, and wherein dinitroso pentamethylenetetramine with inert filler consists of 40% of the former and 60% of the latter.

11. A cold resistant cellular rubber product of a composition comprising 55 to 58% of Pale Crepe, up to 0.2% of a mixture of xylyl mercaptan with inert hydrocarbon, 1.2% to 1.3% sulfur, 0.50% to 1.7% stearic acid, 1.70% to 2.8% zinc oxide, 0.50% to 1.10% salicylic acid with a dispersing agent, 2.90% to 4.90% dinitroso pentamethlyenetetramine with an inert filler, up to 0.3% of 2,2 benzothiazyl disulfide, 11.0% to 12% titanium dioxide, 5.0% to 6.0% of a polymer of butenes so polymerized as to produce a synthetic, heavy-bodied oil-like product, and 16.0 to 18.0% of a high molecular weight polyether having the chemical formula $C_4H_9OC_2H_4OC_2H_4OCH_2OC_2H_4OC_2H_4OC_4H_9$ 12. A cold resistant cellular rubber product of a composition comprising 55 to 58% of Pale Crepe, up to 0.2% of a mixture of xylyl mercaptan with inert hydrocarbon, 1.2% to 1.3% sulfur, 0.50% to 1.7% stearic acid, 1.70% to 2.8% zinc oxide, 0.50% to 1.10% salicylic acid with a dispersing agent, 2.90% to 4.90% dinitroso pentamethylenetetramine with an inert filler, up to 0.3% of 2,2 benzothiazyl disulfide, not more than 0.1 tetramethyl thiuram, 11.0% to 12% titanium dioxide, 5.0% to 6.0% of a polymer of butenes so polymerized as to produce a synthetic, heavy-bodied oil-like product, and 16.0 and 18.0% of a high molecular weight polyether having the chemical formula $C_4H_9OC_2H_4OC_2H_4OCH_2OC_2H_4OC_2H_4OC_4H_9$

WILLIAM U. HOHWIELER.

References Cited in the file of this patent

UNITED STATES PATENTS

| Number | Name | Date |
| --- | --- | --- |
| 2,218,167 | Harkins | Oct. 15, 1940 |
| 2,491,709 | Briggs | Dec. 20, 1949 |
| 2,534,833 | Smyers | Dec. 19, 1950 |
| 2,544,483 | Baum | Mar. 6, 1951 |
| 2,602,784 | Taylor | July 8, 1952 |

OTHER REFERENCES

Unicel ND, Dupont, Report No. 47-3, May 1947, by L. S. Bake, pages 1 to 4.

"Thiokol Facts," March 1944, page 11.